United States Patent
Waldie et al.

(10) Patent No.: US 6,742,064 B2
(45) Date of Patent: May 25, 2004

(54) PROGRAMMABLE THROTTLE CIRCUIT FOR EACH CONTROL DEVICE OF A PROCESSING SYSTEM

(75) Inventors: Arthur Howard Waldie, Albuquerque, NM (US); Robert Ward James, Albuquerque, NM (US)

(73) Assignee: Goodrich Corp., Charlotte, NC (US)

( * ) Notice: Subject to any disclaimer, the term of this patent is extended or adjusted under 35 U.S.C. 154(b) by 519 days.

(21) Appl. No.: 09/829,019

(22) Filed: Apr. 9, 2001

(65) Prior Publication Data

US 2001/0047444 A1 Nov. 29, 2001

Related U.S. Application Data

(60) Provisional application No. 60/204,198, filed on May 15, 2000.

(51) Int. Cl.$^7$ ............................................. G06F 13/372
(52) U.S. Cl. ...................... 710/124; 710/119; 710/123; 710/240
(58) Field of Search ................................. 710/100, 124, 710/123, 119, 240, 243, 36, 244, 113; 711/167, 151, 150, 154; 340/825.5; 713/322

(56) References Cited

U.S. PATENT DOCUMENTS

| | | | | |
|---|---|---|---|---|
| 4,148,011 A | * | 4/1979 | McLagan et al. | 340/825.5 |
| 4,262,331 A | * | 4/1981 | Freeland et al. | 710/124 |
| 4,347,567 A | * | 8/1982 | DeTar et al. | 711/154 |
| 5,142,682 A | * | 8/1992 | Lemay et al. | 710/243 |
| 5,396,602 A | * | 3/1995 | Amini et al. | 710/113 |
| 5,433,892 A | * | 7/1995 | Czech | 252/500 |
| 5,634,131 A | * | 5/1997 | Matter et al. | 713/322 |
| 5,649,161 A | * | 7/1997 | Andrade et al. | 711/167 |
| 5,652,894 A | * | 7/1997 | Hu et al. | 713/322 |
| 5,809,278 A | * | 9/1998 | Watanabe et al. | 711/150 |
| 5,887,194 A | * | 3/1999 | Carson et al. | 710/36 |
| 6,178,486 B1 | * | 1/2001 | Gill et al. | 711/151 |
| 6,199,127 B1 | * | 3/2001 | Ajanovic | 710/100 |
| 6,286,083 B1 | * | 9/2001 | Chin et al. | 711/151 |
| 6,446,151 B1 | * | 9/2002 | Fischer et al. | 710/124 |
| 6,618,778 B1 | * | 9/2003 | MacCormack | 710/244 |

* cited by examiner

Primary Examiner—Xuan M. Thai
Assistant Examiner—Justin I. King
(74) Attorney, Agent, or Firm—David R. Percio; Calfee, Halter & Griswold LLP

(57) ABSTRACT

A processing system comprises: a shared system resource; a plurality of control devices, each assignable with a task having a predetermined maximum time to complete, the control devices time sharing the system resource in the process of performing their assigned tasks in accordance with a predetermined sequence; and an arbiter circuit for regulating access of said control devices to the system resource. Each control device includes a throttle circuit coupled to the arbiter circuit and individually programmable to control in cooperation with the arbiter circuit utilization of the system resource by the corresponding control device so that each control device may perform its task within the predetermined maximum completion time thereof.

14 Claims, 3 Drawing Sheets

PROGRAMMABLE THROTTLE CIRCUIT FOR EACH CONTROL DEVICE OF A PROCESSING SYSTEM

This application claims priority from U.S. Provisional Application Serial No. 60/204,198 filed May 15, 2000.

BACKGROUND OF THE INVENTION

In a processing system, a number of devices including a central processing unit (CPU) and memory are coupled to a time shared processor bus through which digital words are transferred from one device to another under software task control of the CPU or other control device. These control devices generally operate autonomously to perform certain tasks according to some sequence. For example, in FIG. 1A which is a time graph exemplifying a control device, like a CPU or DMA controller, for example, carrying out tasks 1,2,3 and 4 in a predetermined sequence. In performing these tasks, the control device generally requires access to the processor bus and more than one control device may require access to the processor bus concurrently in order to carry out their individual tasks. A bus arbiter is generally provided to regulate access to the bus among the various control devices requiring access according to a predetermined priority scheme to prevent collisions. However, when permitted, access is limited to the performance of only one or two cycles of the task, but not the entire task in order to prevent any one control device from dominating access to the bus.

Certain tasks carried out by the control devices are considered critical from the perspective that they must be performed within an absolute maximum time (AMT). Each critical task may have its own individual AMT based on the real time application being performed. The AMT is determined by calculating the actual execution time of the task under quiescent conditions and providing a time margin for taking into account variables that may cause the execution time to vary. To ensure that these critical tasks are carried out within their respective AMTs, throttle circuits are provided in control devices which can be set to limit the maximum speed of transfer of each device which effectively minimizes or blocks their utilization of the bus for given periods of time. An example of throttling is shown in the time graphs of FIGS. 1B through 1E. Referring to FIG. 1A, suppose task 2 is the critical task of a control device. Time line 10 exemplifies a time when task 2 would normally complete its execution, the time interval 12 represents the time margin and time line 14 represents the time when task 2 must be completed so as not to exceed its AMT.

FIG. 1B depicts an example where a DMA controller which is performing another task requires access of the bus at the time task 2 is being performed. The bus arbiter, then, would have to regulate the access to the bus. If the throttling time of the DMA controller is set too short, it will gain access to the bus frequently causing the execution of task 2 to exceed its AMT by a substantial amount of time as shown in FIG. 1B. In FIG. 1C, the throttle time of the DMA controller is increased, but still inadequate to permit the completion of task 2 within its AMT and the same happens in the example of FIG. 1D. Finally, in the example of FIG. 1E, the throttle time of the DMA controller is set to permit task 2 to end within its AMT (see line 14 of FIG. 1A), but the setting is too coarse, not allowing for another DMA cycle to be performed until well into task 3 which may affect the margin established for the task being performed by the DMA controller.

Accordingly, a throttling circuit programmable with fine throttling time resolutions (as close as possible to the processor clock period) to permit a maximizing of task execution while maintaining the margins of other control devices concurrently utilizing the processor's shared resources is desirable. This fine tuning is especially desirable in real time applications in which critical software tasks are abundant.

SUMMARY OF THE INVENTION

In accordance with one aspect of the present invention, a processing system comprises: a shared system resource; a plurality of control devices, each assignable with a task having a predetermined maximum time to complete, the control devices time sharing the system resource in the process of performing their assigned tasks in accordance with a predetermined sequence; an arbiter circuit for regulating access of said control devices to the system resource; and a throttle circuit corresponding to each control device, each throttle circuit coupled to the arbiter circuit and individually programmable to control in cooperation with the arbiter circuit utilization of the system resource by the corresponding control device so that each control device may perform its task within the predetermined maximum completion time thereof.

In accordance with another aspect of the present invention, a throttle circuit is operative for use in each of a plurality of control devices of a processing system which comprises a shared system resource; and an arbiter circuit for regulating access of the control devices to the system resource, each control device assignable with a task having a predetermined maximum time to complete, the control devices time sharing the system resource in the process of performing their assigned tasks in accordance with a predetermined sequence. The throttle circuit comprises a delay circuit coupled to the arbiter circuit and individually programmable to control in cooperation with the arbiter circuit utilization of the system resource by the corresponding control device so that each control device may perform its task within the predetermined maximum completion time thereof.

DETAILED DESCRIPTION OF THE PRESENT INVENTION

Figure 1A:
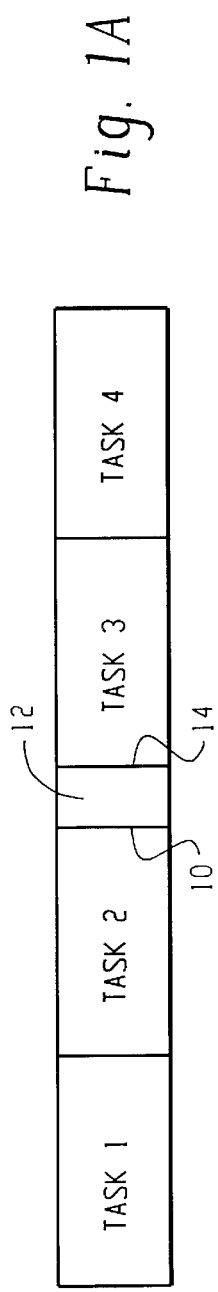
FIGS. 1A–1E are time graphs exemplifying the processing of tasks by control devices of a processing system sharing common resources.
Figure 1B:
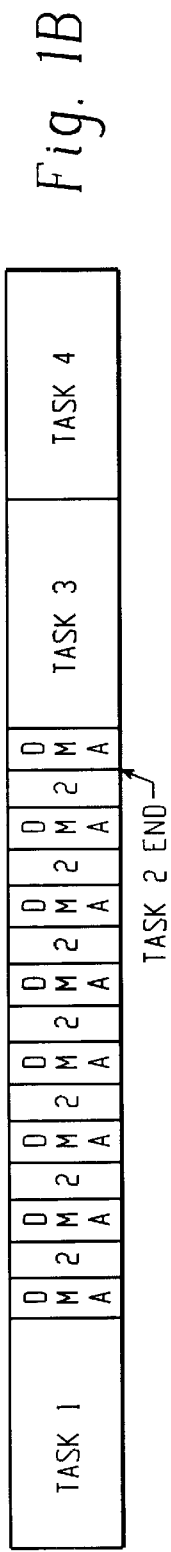
Figure 1C:
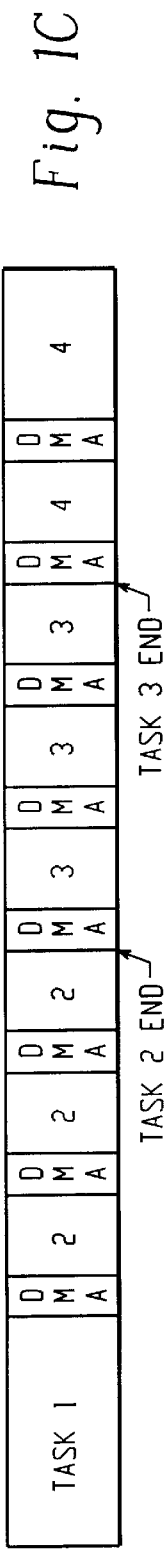
Figure 1D:
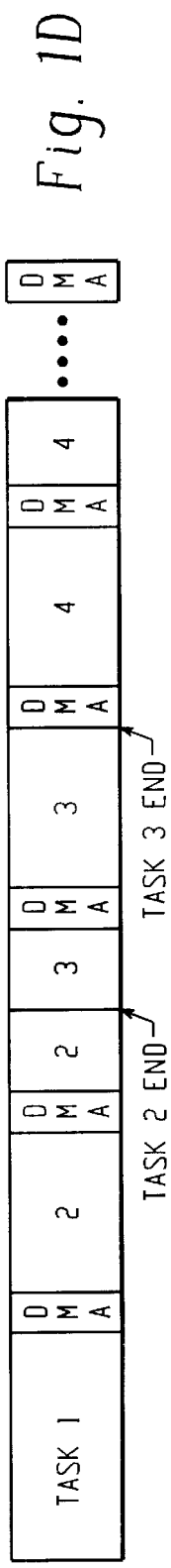
Figure 1E:
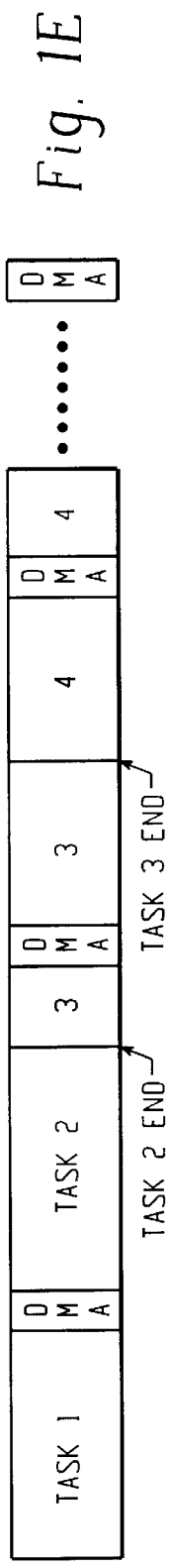
Figure 2:
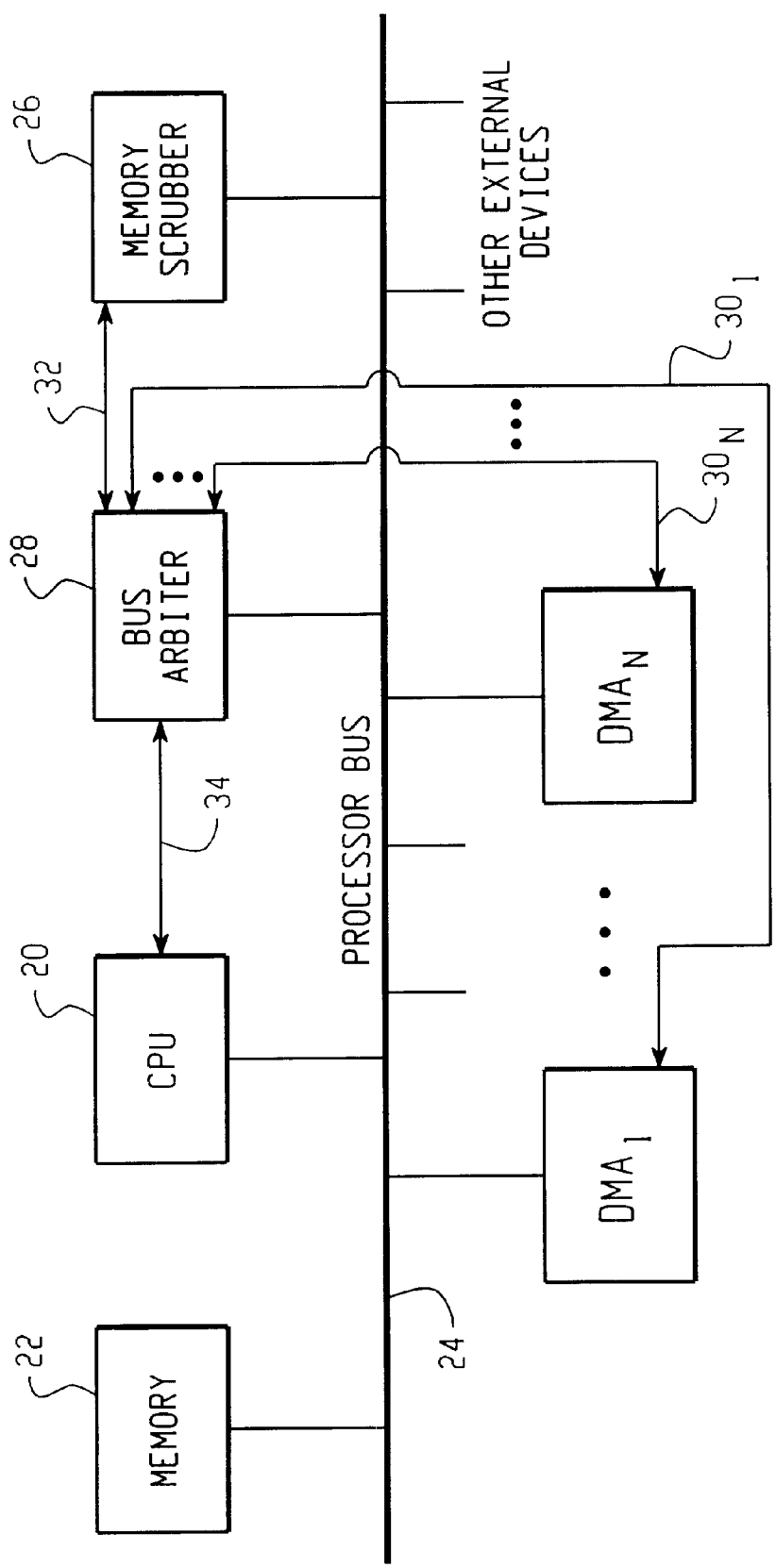
FIG. 2 is a block diagram schematic of a processing system suitable for use as a working environment for the present invention.

Referring to FIG. 2, a CPU 20 and memory 22 are coupled to a processor bus 24. Additional control devices, like a plurality of DMA controllers, depicted by the blocks DMA 1 through DMA N (where N may be 4 for the present embodiment), a memory scrubber circuit 26 and a bus arbiter circuit 28, for example, may also be coupled to the processor bus 24 as well as additional other external devices. Such control devices are all assigned certain tasks to perform on a sequential basis and all share the common bus 24 and memory 22, at times, for performing their respective tasks. As indicated herein above, some of these tasks are critical and should be completed within an AMT. By the throttling of these tasks such as memory scrubbing by circuit 26 and certain DMA transfers by the devices DMA 1 through DMA N, for example, the margins of the critical tasks within their respective AMTs may be regulated.

Each of the control devices coordinate their shared resource service requests through the bus arbiter 28 via separate signal lines. For example, DMA controllers 1 through N are coupled to the arbiter circuit 28 over signals lines $30_1$ through $30_N$, respectively, memory scrubber 26 is coupled to the arbiter circuit 28 over signal lines 32, and the CPU 20 is coupled to circuit 28 over signal lines 34. The other external devices will have their own individual connections to the arbiter circuit 28 (not shown). The arbiter circuit 28 ensures against (1) collisions on the processor bus 24 among the various devices requesting service thereof, and (2) any one such device dominating the use of the bus 24, at least to the point that margins do not exist for the other devices.

In accordance with the present invention, a throttle circuit is included in the control devices (except the CPU 20, for the present embodiment) that have the capability of requesting service of the shared resources of the processing system via the bus arbiter, for example. Each such throttling circuit may be programmed with very fine time resolutions (close to the processor or bus system clock periods, for example) to limit the maximum speed of transfer of the respective device, thereby throttling its speed and minimizing its utilization of the shared resources of the processing system. The programmability of the throttling circuits provides a way for the processing system to maximize the transfers of the devices while maintaining their required AMT margins. The fine tuning is especially necessary in real time system applications where appropriate margins are applied to critical software tasks as well as the devices themselves. By programmably fine tuning the throttling of these devices such as the memory scrubber 26 and DMA controllers, for example, AMT margins of the critical tasks can be guaranteed independently of the external nature of the DMA transfers and scrubbing tasks being serviced.

Figure 3:
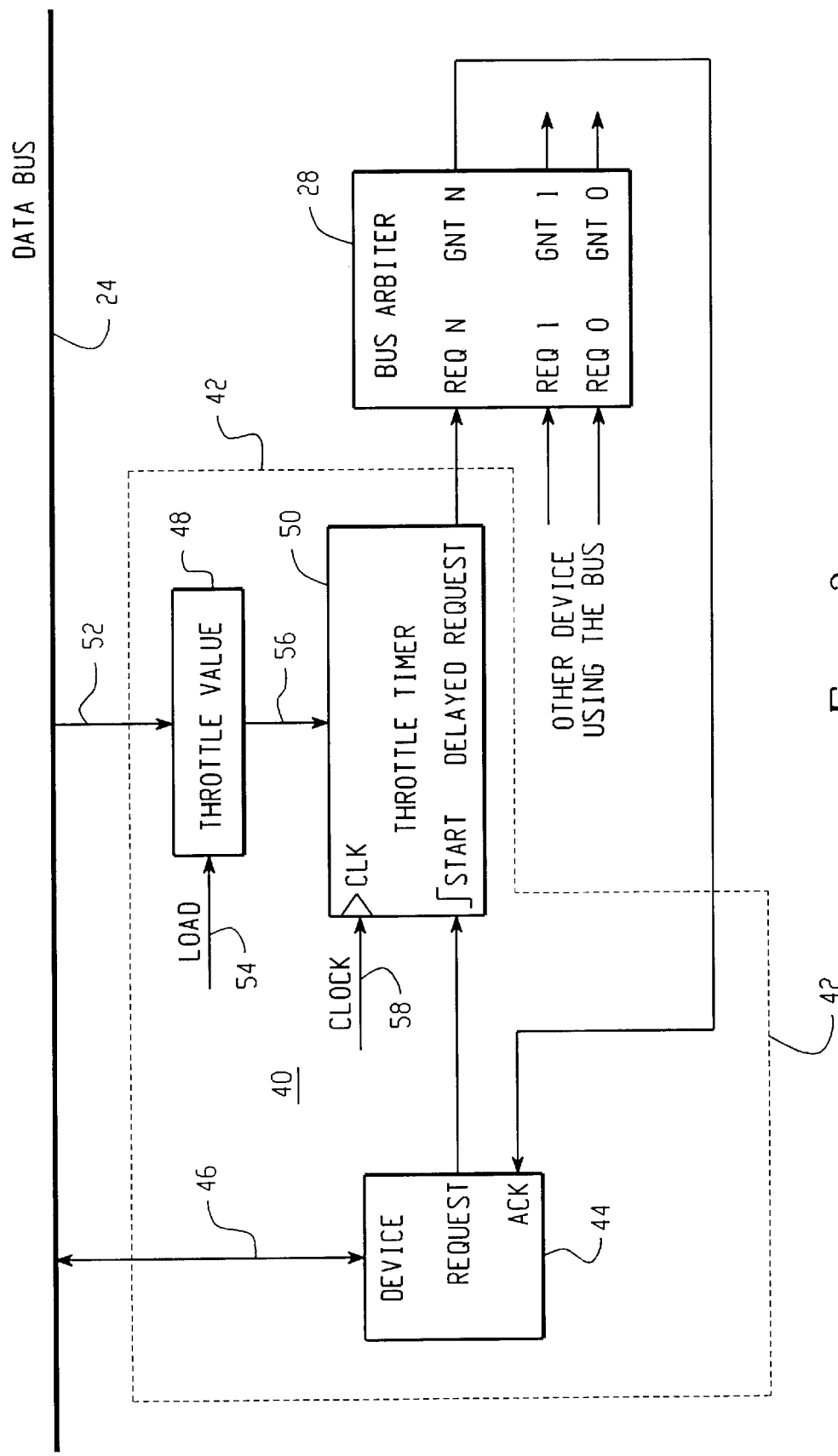
FIG. 3 is a block diagram schematic of a throttling circuit suitable for embodying the principles of the present invention.

FIG. 3 depicts an exemplary embodiment of such a throttling circuit 40 in accordance with the principles of the present invention. Referring to FIG. 3, the throttling circuit 40 is shown included in a control device (enclosed by the dashed lines 42) which may be any one of the foregoing described devices, except the CPU for the present embodiment. Each device may include a circuit 44 which interacts with the processor bus over a set of signal lines 46 for governing transfers over the bus 24 in the performance of its pre-assigned tasks. Before the device can gain access to the bus 24, the circuit 44 first gains permission of the bus arbiter 28 by (1) sending a request signal to circuit 28 which is received at the correspondingly respective REQ N input of circuit 28 over the separate lines interconnecting the two devices, and (2) receiving a grant signal provided by a corresponding output GNT N of circuit 28 over the same interconnecting lines. The other devices requesting access of the bus 24 will have their own respective REQ inputs and GNT outputs of the arbiter circuit 28. Once the device gains access to the bus via circuit 44 it will cause one or more cycles of the current task to be performed. For example, if the device is a DMA controller, it may transfer one or more words from one device to another before it suspends the activity and again seeks access to the bus.

The throttle circuit 40 also includes a programmable digital word register 48 and a digital delay timer 50. The register 48 may be coupled to the system bus 24 over data lines 52. A load signal may be provided to the register 48 from the processor, for example, over a signal line 54. The output of the register 48 is coupled to a digital word input of the timer circuit 50 over signal lines 56. The timer circuit in the present embodiment may be a counter operated by a clock signal provided thereto over a signal line 58. In the present embodiment, the timer circuit 50 is disposed in the request line between the circuit 44 of the requesting device and the arbiter circuit 28 for delaying the request signal from reaching the REQ N input of the arbiter circuit for a programmable period of time. The register 48 includes a sufficient number of bits to provide a fine tuning of throttling time for the immediate device. In the present embodiment, register 48 is programmable to accept and store an eleven bit digital word representative of a programmed throttle time. The counter 50 may be an up or down counter loadable with the digital word of the register 48 and operative to count up to or down from the loaded digital word in a time governed by the clock signal 58 which may be one of the processor clocks, for example.

In operation, a digital word representative of a throttle time may be programmed into the register 48 by the CPU 20, for example, using the data bus and load signal 54. Thereafter, the programmed word of register 48 is loaded into a register of the counter 50 over lines 56. Now, whenever a request signal is generated by the circuit 44, a transition edge thereof starts the counter counting up from a zero count to the count in its loaded register governed by the clock 58. It is understood that the counter 50 may just as well count down from the loaded count to zero count to perform the time delay. In any event, after the counter reaches the end of its count cycle which is the delay time, it generates a request signal to the arbiter circuit 28 which in turn generates a permission grant signal back to the circuit 44. While the present embodiment includes the delay timer 50 in the request line, it is understood that it may also be disposed in the grant line without deviating from the principles of the present invention. The important aspect of the invention is that the device be programmable to throttle its transfer speed with a fine enough resolution to efficiently utilize the shared processor resources while guaranteeing the AMT margins of the critical tasks which may be assigned to any of the various processes or tasks of the processing system.

While the present invention is described herein above in connection with one or more embodiments, it is understood that the invention should not be limited by any such embodiments. Rather, the present invention should be construed in breadth and broad scope in accordance with the recitation of the claims appended hereto.

What is claimed is:

1. A processing system comprising:
   a shared system resource;
   a plurality of control devices, each assignable with a task having a predetermined maximum time to complete, said control devices time sharing said system resource in the process of performing their assigned tasks in accordance with a predetermined sequence;
   an arbiter circuit for regulating access of said control devices to said system resource;
   a system clock; and
   a throttle circuit corresponding to each control device, each throttle circuit coupled to said arbiter circuit and individually programmable with a digital time word that has a time resolution close to the period of said system clock, each throttle circuit governed by said system clock and operative in cooperation with said arbiter circuit to block access to said system resource by the corresponding control device for a time period based on the system clock and corresponding digital time word so that each control device may perform its task within the predetermined maximum completion time thereof.

2. The processing system of claim 1 wherein each throttle circuit includes a digital delay timer coupled between its corresponding control device and the arbiter circuit, said digital delay timer programmable with the digital time word and governed by the system clock to delay communication between the corresponding control device and arbiter circuit substantially for the time period over which the corresponding control device is blocked from access to the system resource.

3. The processing system of claim 2 including a central processing unit (CPU); wherein the system resource comprises a processor bus; and wherein the CPU is coupled to the processor bus and operative to program the individual programmable delay timers of the throttle circuits over the processor bus.

4. The processing system of claim 2 wherein the system resource comprises a processor bus; and wherein the digital delay timer is programmable from the processor bus.

5. The processing system of claim 4 wherein each digital delay timer comprises a digital counter circuit and a register programmable from the processor bus with the digital time word, said register operative to load the digital time word into the digital counter circuit upon a load command, said digital counter circuit operative in response to a communication between the corresponding control device and arbiter circuit to effect a delay of said communication for the time the counter takes to count through the digital time word utilizing the system clock.

6. The processing system of claim 2 wherein each control device includes means for generating a request signal to the arbiter circuit for gaining access to the system resource and means for accessing the system resource in response to a grant signal from the arbiter circuit; and wherein each digital delay timer is disposed between the generating means and arbiter circuit to delay the request signal from reaching the arbiter circuit by the time period.

7. The processing system of claim 1 wherein the system resource comprises a processor bus; including a memory coupled to the processor bus; and wherein at least one of the plurality of control devices is a direct memory access (DMA) controller coupled to the processor bus for transferring digital words to and from the memory over the processor bus.

8. A throttle circuit for use in each of a plurality of control devices of a processing system which comprises a shared system resource; a system clock; and an arbiter circuit for regulating access of said control devices to said system resource, each control device assignable with a task having a predetermined maximum time to complete, said control devices time sharing said system resource in the process of performing their assigned tasks in accordance with a predetermined sequence, said throttle circuit comprising a delay circuit coupled to said arbiter circuit and individually programmable with a digital time word that has a resolution close to the period of said system clock, each delay circuit governed by said system clock and operative in cooperation with said arbiter circuit to block access to said system resource by the corresponding control device for a time period based on the system clock and corresponding digital time word so that each control device may perform its task within the predetermined maximum completion time thereof.

9. The throttle circuit of claim 8 wherein the delay circuit includes a digital delay timer coupled between its corresponding control device and the arbiter circuit, said digital delay timer programmable with the digital time word and governed by the system clock to delay communication between the corresponding control device and arbiter circuit substantially for the time period over which the corresponding control device is blocked from access to the system resource.

10. The throttle circuit of claim 9 wherein the system resource comprises a processor bus; and wherein the digital delay timer is coupled to the system bus and programmable by a central processing unit (CPU) of the processing system over the processor bus.

11. The throttle circuit of claim 9 wherein the system resource comprises a processor bus; and wherein the digital delay timer is coupled to the processor bus and programmable from the processor bus.

12. The throttle circuit of claim 11 wherein the digital delay timer comprises a digital counter circuit and a register programmable from the processor bus with the digital time word, said register operative to load the digital time word into the digital counter circuit upon a load command, said digital counter circuit operative in response to a communication between the corresponding control device and arbiter circuit to effect a delay of said communication for the time the counter takes to count through the digital time word utilizing the system clock.

13. The throttle circuit of claim 9 wherein each control device includes means for generating a request signal to the arbiter circuit for gaining access to the system resource and means for accessing the system resource in response to a grant signal from the arbiter circuit; and wherein the digital delay timer is disposed between the generating means of the corresponding control device and arbiter circuit to delay the request signal from reaching the arbiter circuit by the time period.

14. The throttle circuit of claim 8 wherein the corresponding control devices is a direct memory access (DMA) controller coupled to a processor bus of the processing system for transferring digital words to and from a memory of the processing system over the processor bus.

* * * * *